June 23, 1953  O. ELWERT ET AL  2,642,854
TWO-STROKE CYCLE ENGINE WITH SUPERCHARGING INJECTION PUMP
Filed Sept. 9, 1949  5 Sheets-Sheet 1

INVENTORS
Otto Elwert
Adolf Schnürle

BY
Patent Agent

June 23, 1953     O. ELWERT ET AL     2,642,854
TWO-STROKE CYCLE ENGINE WITH SUPERCHARGING INJECTION PUMP
Filed Sept. 9, 1949     5 Sheets-Sheet 3

INVENTORS
Otto Elwert
Adolf Schnürle

BY
Patent Agent

INVENTORS
Otto Elwert
Adolf Schnürle
Patent Agent.

June 23, 1953  O. ELWERT ET AL  2,642,854
TWO-STROKE CYCLE ENGINE WITH SUPERCHARGING INJECTION PUMP
Filed Sept. 9, 1949  5 Sheets-Sheet 5

INVENTORS
Otto Elwert
Adolf Schnürle

BY
Patent Agent

Patented June 23, 1953

2,642,854

UNITED STATES PATENT OFFICE 2,642,854

TWO-STROKE CYCLE ENGINE WITH SUPERCHARGING INJECTION PUMP

Otto Elwert and Adolf Schnürle, Stuttgart, Germany; said Otto Elwert assignor to said Adolf Schnürle; Gertrud Schnürle, sole heir of said Adolf Schnürle, deceased Application September 9, 1949, Serial No. 114,822
In Germany May 13, 1949

29 Claims. (Cl. 123—55)

The present invention pertains to two stroke cycle engines having air scavenged engine cylinders into which after the closing of the exhaust valves or ports liquid fuel, for instance gasoline, is injected by means of high pressure air supplied by a separate pump—hereinafter called blow-in pump—or into which cylinders fuel mixture or gaseous fuel—for instance methane—is delivered at higher than scavenging pressure by said blow-in pump. Each engine cylinder is working in conjunction with a cylinder of said blow-in pump or—in case of double acting pumps—is working in conjunction with one piston side of said blow-in pump.

In engines of the above design operating with gasoline injection a metered quantity of gasoline will be conveyed by a fuel pump to the intake pipe of said blow-in pump or to the pressure lines leading from said blow-in pump to the engine cylinders, the blow-in pump supplying the air required for atomizing the fuel and injecting it into the engine cylinders. In engines operating with fuel mixture or fuel gas the pump will suck in a metered quantity of mixture or gas and deliver it to the engine cylinders. As the fuel or mixture is blown into the engine cylinders only after the closing of the exhaust ports or valves, there will be no loss of fuel or air. This results in lower fuel consumption.

Engine torque and engine power will also be considerably increased by the supercharging effect of the additional volume of air or gas entering the engine cylinder.

The fuel can be blown into the engine cylinder through a spring loaded valve which, for instance, can be located in the cylinder head and can be actuated by changes in the pressure of the gas or air to be injected. The spring of such a valve can, for instance, be held under an initial pressure of 0.5 to 1.0 atue, in order to assure good fuel atomization at lowest engine speeds or when starting the engine.

It is also possible to use a springless check valve, if the flow of the air or gas from the pump cylinder to said check valve is governed by the pump piston movement. In this case a passage is cut into the pump piston from the top of the piston to the outside of the skirt; the skirt opening of this passage lining up with the pump cylinder opening of the pressure line leading to the check valve during the injection period. It is not expedient to locate the check valve in the cylinder head resp. in the part of the engine cylinder wall adjoining the combustion chamber. The check valve should be located a certain distance from the combustion chamber where it is only subject to comparatively low pressures and temperatures of the combustion gases. If the injection is timed by the movement of the pump piston, it is possible to entirely dispense with the check valve, if the pressure line connects to the engine cylinder immediately above the scavenging or exhaust ports, so that the aperture of said pressure line is located a relatively large distance from the combustion chamber at which the pressure and temperature of the combustion gases entering the pressure line are already comparatively low; the aperture on the pump cylinder side of said pressure line being closed by the pump piston at the time when combustion gases enter said pressure line.

The present invention pertains particularly to two stroke Otto cycle V-type engines with two banks of engine cylinders and is especially adaptable to 90° V type 4 cylinder engines with two banks of 2 engine cylinders. The crankshaft of such a 4 cylinder V engine has two crank throws 180° apart providing for a power impulse every 90° of crank angle.

According to the invention the blow-in pump is also designed as a 90° V type four cylinder pump, which is located between the two engine cylinder banks above the scavenging air receiver. It is expedient to have the crankshaft of the blow-in pump rotate in the same direction as the engine crankshaft, so that coordinated engine and pump cylinders are adjoining and have parallel cylinder axes. The pressure lines from the pump to the engine cylinders can, thus, be kept as short as possible and the clearance volume as small as possible. The pump crankshaft is leading the engine crankshaft 60° to 90° crank angle, so that the pump piston is in its compression dead center position when the coordinated engine piston has just closed the exhaust ports on its compression stroke.

The balancing of the pump, the crankshaft of which has two crank throws or eccentrics spaced 180° apart, is effected by crankshaft counterweights. Primary torque forces caused by the pump pistons cancel each other, thereby relieving the pump drive of stresses caused by these forces.

The pump can be a separate casting and can be so designed that it also serves as a cover for the scavenging air receiver. The fuel pump shaft is preferably coupled to the free end of the pump crankshaft. The drive of the distributor is also taken off the fuel pump shaft resp. off the pump crankshaft. Air or mixture enters the pump cylinders preferably through intake ports in the pump cylinder wall. In order to assure high volumetric efficiency of the pump at higher engine speed, air for charging the pump cylinders can be taken from the scavenging air receiver, as the pressure of the scavenging air increases with the square of the engine speed. In this case the scavenging air blower has to be so designed as to deliver a correspondingly larger volume of air.

If the pump delivers merely the quantity of air required for injecting and atomizing the fuel charge, the displacement volume of the pump will be about 10% of the displacement volume of the engine cylinders. This proportion is also sufficient, if the engine is operating on methane, as methane requires a 1:10 fuel-air ratio. If, however, the pump is, as particularly in automobile engines, required to deliver a sufficient volume of air to raise the mean effective pressure from appr. 7 kg./cm.$^2$ to appr. 9 kg./cm.$^2$, the displacement volume of the pump will have to be increased to about 40% of the engine displacement.

In engines operating on gaseous fuel additional air for supercharging can also be supplied by the pump in order to increase engine torque. Engine power will then be computed by the total cylinder charge volume composed of scavenging air and supercharged gas-air mixture.

In the 4 cylinder V type engines shown in the accompanying drawings scavenging air is furnished by a centrifugal blower which is located on the left end of the engine above the crankshaft. In order to reduce the engine over-all length the crankshaft gear is mounted on the extreme left crankcheek of the crankshaft. The drive of the pump is taken off the pinion on the impeller shaft of the blower; the gear on the shaft of the pump having the same diameter as the crankshaft gear. It would also be possible to have the pump shaft gear mesh with an intermediate gear. By placing the pump between the two banks of engine cylinders the pump is readily accessible and close to the engine cylinders. It will be found expedient to mount the pump appr. in the bisecting plane of the engine V angle, so that the pressure lines leading from the pump to the engine cylinders are as short as possible. The lines leading from the fuel pump to said pressure lines are also comparatively short. However, as the fuel is delivered under very low pressure and for a comparatively long time interval (90°–180°), it is not essential to have short fuel lines.

A double acting pump may also be used instead of a single acting pump. In a 4 cylinder V engine a 90° V type pump with an one throw crankshaft and 2 double acting pistons may be used, each piston working in conjunction with the adjoining bank of two engine cylinders. A double acting V type pump is used to advantage in engine designs requiring a small over-all length of the pump.

The two cylinders of a double acting pump could, however, also be arranged in line, if a small width of the pump is desirable as for instance in V engines with the exhaust manifolds mounted between the two banks of cylinders.

Ignition of the engine cylinder charge is effected by a spark plug which is located in the cylinder head. Due to the good atomization of blown in fuel it is possible to utilize fuels of low volatility like kerosene and diesel oil in engines designed in accordance with the present invention. The finely atomized fuel mist does easily ignite, even when starting the engine.

The volume of air for scavenging the engine cylinders is regulated in relation to engine load by means of a throttle valve in the intake pipe of the scavenging air blower. If the air charge of the pump cylinders is drawn from the scavenging air receiver, the throttle valve of the blower will, in accordance with the invention, also regulate the volume of blow-in air. In case the scavenging air blower furnishes more air than is drawn into the pump cylinders, the engine cylinders will be scavenged by air flowing from the receiver through the scavenging ports. In case the blower is throttled down, so that it delivers less air than required by the pump, the pump will in addition to the air furnished by the blower draw combustion gases out of the engine cylinders through the scavenging ports and through the receiver, so that the receiver will contain a mixture of air and combustion gases. The pump will then compress a mixture of air and combustion gases. Scavenging of the engine cylinders will, therefore, only begin, after the engine load has increased to a predetermined size. At low engine loads the entire combustion air will be supplied to the engine cylinders by the pump.

If contrary to the above described regulating method the volume of blow-in air or gas is regulated by a throttle valve in the intake pipe of the pump, the vacuum pressure behind the throttle valve can be utilized to move a servo piston actuating the control rods of the fuel pump and of the throttle valve of the scavenging air blower. As changes in vacuum pressure have a definite relation to changes in engine load, the servo piston working in conjunction with the pump throttle can be used as a governor and, thus, replaces a centrifugal type governor, which would normally be required.

Pumps used for metering the fuel and conveying it to the intake pipe or to the pressure lines of the pump may be of various types and can for instance be of the constant stroke type, of the variable stroke type with helical bypass edge or of the continuous delivery type with bypass. The fuel pump may be of very simple design as the required pump pressure is low and the duration of injection relatively long.

The metering of liquid fuel can also be effected by means of a carburetor or in case of liquefied fuel gas by means of a pressure regulator in the intake passage of the blow-in pump. The carburetor will have to furnish an extremely rich gasoline-air mixture which may be up to 10 times as rich as the mixture normally used in combustion engines, the fuel-air ratio of the mixture depending on the difference in size between pump piston and engine piston displacement. The vacuum behind the carburetor throttle valve can here also be used to advantage for actuating a servo piston.

Figure 1:
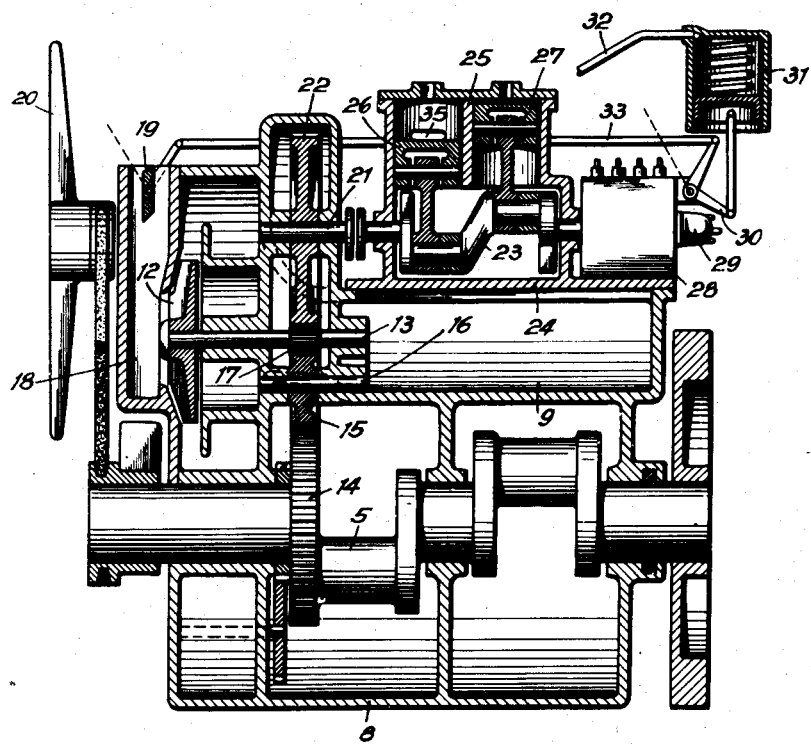
Fig. 1 is a horizontal sectional view of a 4 cylinder V-engine; the cutting plane passing through the scavenging air blower, the blow-in pump, the drive gear train and the scavenging air receiver; the fuel pump is shown in projected view.
Figure 2:
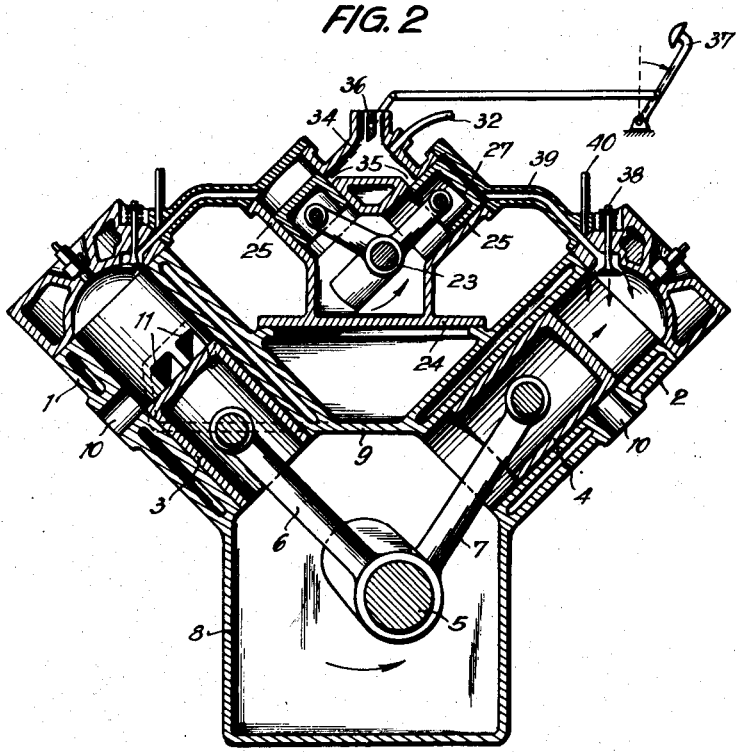
Fig. 2 is a transverse sectional view of the engine shown in Fig. 1; the cutting plane passing through two engine cylinders and the two pump cylinders which work in conjunction with said two engine cylinders.

Figs. 1 and 2 show a 4 cylinder 90° V-type engine with centrifugal scavenging air blower. In Fig. 2 the numeral 1 designates a left and the numeral 2 a right engine cylinder, 3 a left and 4 a right engine piston, 5 a two throw crankshaft, 6 and 7 two connecting rods fitted side by side to the same crankpin. 8 is the crankcase and 9 a scavenging air receiver located within the crankcase. 10 are the exhaust ports facing away from the pump, and 11 the scavenging ports which are arranged on both sides of the exhaust ports and which direct the scavenging air towards the portion of the cylinder wall opposite the exhaust ports in order to effect loop scavenging of the engine cylinders.

In Fig. 1 the numeral 12 designates the impeller of the scavenging blower and 13 the impeller shaft on which the pinion 17 is mounted. 14 is the large diameter crankshaft gear for the blower drive which in the engine design shown is part of the extreme left hand crankcheek in order to reduce the overall length of the engine. 15 is an intermediate gear between crankshaft gear and impeller shaft pinion 17 and 16 is the shaft for gear 15. 18 is the intake pipe of the blower and 19 a throttle valve in said intake pipe. 20 is the fan which is driven by means of a V belt from the crankshaft 5.

The shaft 21 with the gear 22 is coupled with the blow-in pump 25. The gear 22 meshes with the impeller shaft pinion 17 and has the same diameter as the crankshaft gear 14 and therefore rotates at crankshaft speed. The 90° V-type pump shown in Figs. 1 and 2 has 4 single acting cylinders. 23 is the two throw crankshaft and 24 the crankcase of the pump. The crankcase 24 serves as a cover for the receiver 9, which is part of the crankcase. The crankshaft 23 can be provided with counterweights on the two outer crankcheeks. 25 are the pump cylinders. 26 is a pump piston in its lower dead center position. 27 is a pump piston in its upper dead center i. e. blow-in position. 28 in Fig. 1 is the fuel pump required for metering the fuel and delivering it to the passage connecting the pump cylinders with the engine cylinders.

The fuel pump is here directly coupled to the crankshaft of the pump. The drive of the distributor 29 is taken directly off the fuel pump shaft. 30 is the operating lever for changing the setting of the fuel pump. 31 is a vacuum operated regulating device with spring loaded piston, said regulating device being connected to the intake pipe of the blow-in pump by vacuum line 32. The vacuum operated regulating device is linked to the fuel pump operating lever 30, which in turn is linked to the blower throttle valve 19 by means of a control rod 33. Therefore a predetermined amount of scavenging air as well as a predetermined amount of fuel will correspond to each position of the regulator piston at all engine speeds. The regulator is shown in its full load position in Fig. 1.

34 in Fig. 2 is the common intake pipe for all pump cylinders 25. 35 are the inlet ports of the pump cylinders, which are opened and closed by the movement of the pump pistons. 36 is the throttle valve in the intake pipe 34. The throttle valve 36 is operated by the accelerator pedal, so that the regulator operated by changes in vacuum pressure at said throttle valve is acting as a governor.

38 in Fig. 2 is the blow-in valve in the engine cylinder head; said valve is shown in blow-in position, it having been opened against the spring pressure by the increase in pressure of the air delivered by the pump piston 27 through pressure lines 39. 40 is part of the fuel line connecting the fuel pump 28 to the pressure line. The right hand engine piston 4, the blow-in valve 38 and the right hand pump piston 27 are shown in blow-in position; the exhaust port 10 being covered by the engine piston 4.

Both engine and pump crankshafts rotate in the same direction in Fig. 2 as indicated by the arrows. The axes of those engine and pump cylinders, which work in conjunction with one another, are parallel. In order to keep the pressure lines 39 as short as possible and their clearance volume as small as possible, said pressure lines originate at the pump cylinder head and said blow-in valves are located on the pump side of the engine cylinder heads.

Figure 3:
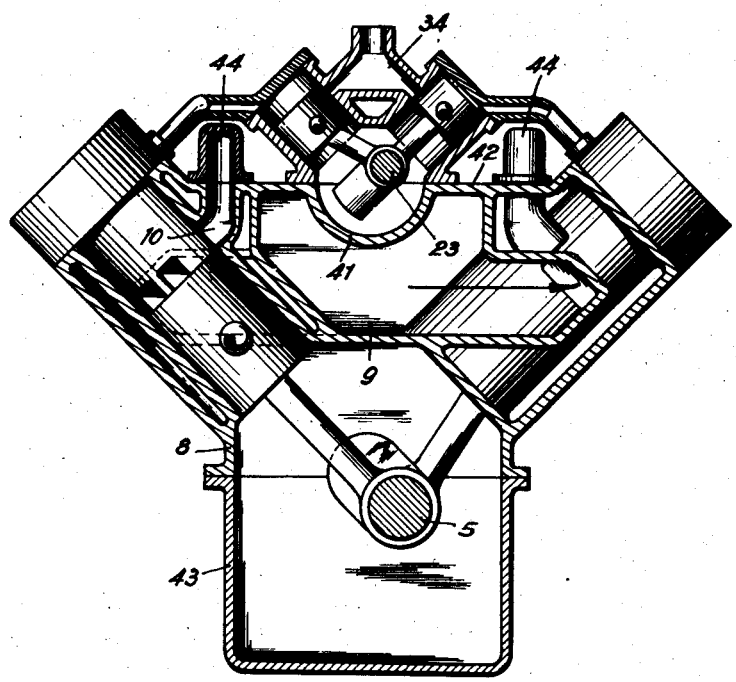
Fig. 3 is a transverse sectional view of the engine; the cutting plane passing through one of the engine cylinders of the left cylinder bank, through the space between the two cylinders of the right bank and through two cylinders of the blow-in pump.

Fig. 3 shows a transverse sectional view of a V-engine of the same general type as the engine shown in Figs. 1 and 2; but with a differently constructed crankcase and differently positioned engine cylinder ports. The receiver 9 is here also an integral part of the crankcase 8; the lower part of the pump crankcase being cast integrally with the engine crankcase. The upper face 42 of the engine crankcase lies in the same plane as the axis of the crankshaft 23 of the pump. The upper part of the pump with the pump cylinders is bolted to said surface 42. The pump crankshaft 23 is installed from the top and is fastened to the crankcase 8. 43 is the lower part of the engine crankcase; the engine crankshaft being installed from below. 44 in Fig. 3 are the two exhaust manifolds of the engine cylinder banks and 10 the exhaust ports, which contrary to the engine design shown in Figs. 1 and 2 face here towards the pump.

Figure 4:
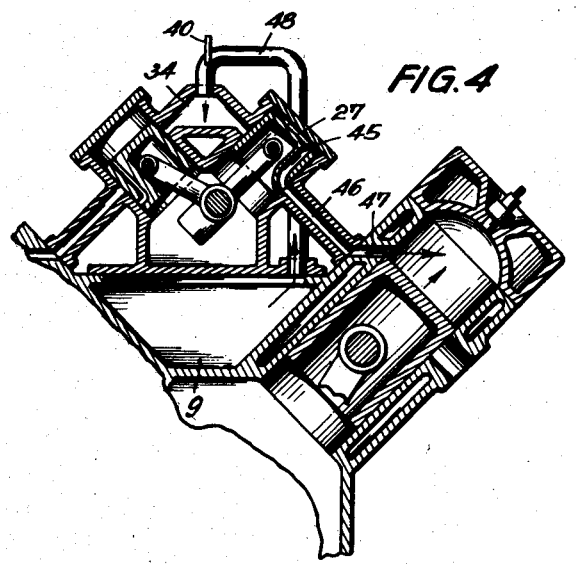
Fig. 4 is a transverse sectional detail showing one of the right hand engine cylinders and the blow-in pump. The flow of air through the pump cylinders is here governed by the piston movement.

Fig. 4 shows a single acting V-type blow-in pump, which differs from the pump design shown in Fig. 2 in that the discharge of the compressed air or gas is effected through ports in the pump cylinder wall, the closing and opening of said ports being controlled by the movement of the pump pistons. The right hand pump piston is shown in its top dead center compression position. 45 is a passage through the pump piston, said passage extending from the top of the piston to the lower portion of the piston skirt. 46 is the pressure line between the pump and the engine cylinders, the pump cylinder end of said passage lining up with the passage 45, when the pump piston is in its compression dead center position. The pressure line 46 can, if the pump cylinder outlet port is controlled by the movement of the pump piston either lead to a blow-in valve in the engine cylinder wall or can directly connect, as shown in Fig. 4, to a port 47 in the engine cylinder wall, said port 47 being positioned a considerable distance below the top dead center position of the top of the engine piston but still above the engine cylinder exhaust ports. The air or gas entering through ports 47 is preferably directed towards the center of the engine cylinder air charge, in order to effect a rapid formation of a combustible mixture. Fuel can either be injected into the pressure line or into the pump cylinder intake pipe 34 through fuel line 40. During the power stroke of the engine piston the ports 47 will be opened admitting combustion gases of a comparatively low pressure and low temperature into the pressure line 46, the pump end of said line 46 being closed by the pump piston at that time as indicated by the left hand pump piston in Fig. 4. The passage 45 is connected to the pressure line 46 only during the blow-in period.

The numeral 48 in Fig. 4 designates an air line leading from the receiver 9 to the intake pipe 34 of the pump. The charging of the pump cylinders with air under scavenging pressure results in an increased charge at higher engine speeds as described further above. The blower throttle 19 (see Fig. 1), thus, controls the quantity of scavenging air as well as the quantity of the air drawn in by the pump cylinders. The air charge of the pump cylinders can be diluted by exhaust gases at certain engine loads as has been pointed out further above.

Figure 5:
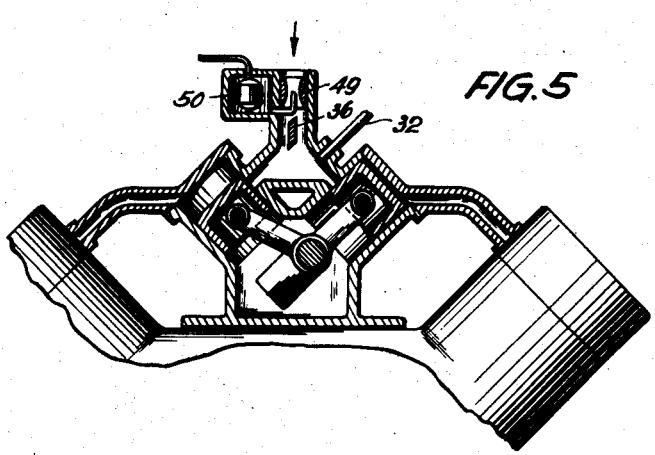
Fig. 5 is a transverse sectional view of a V-type blow-in pump with carburetor and also shows the outline of the engine.

Fig. 5 shows a pump similar to the pump in Fig. 2 except that fuel is metered by a carburetor jet surrounded by a venturi inserted into the intake pipe. 50 is the carburetor float chamber. 36 is the carburetor throttle valve and 32 the line to the vacuum operated governor actuating the blower throttle.

Figure 6:
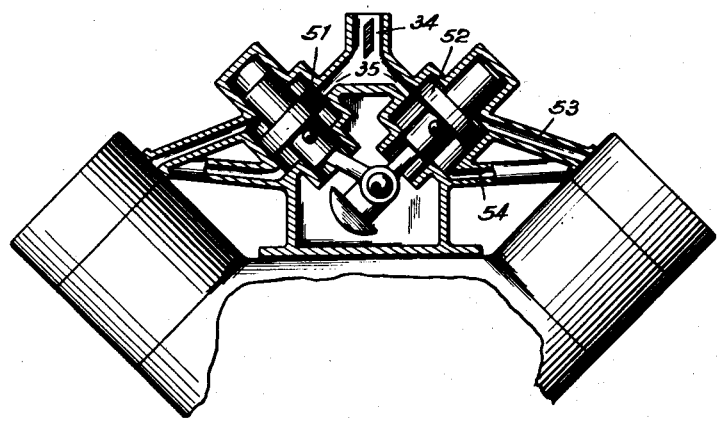
Fig. 6 is a transverse sectional view of a V-type blow-in pump with two double acting pistons.
Figure 7:
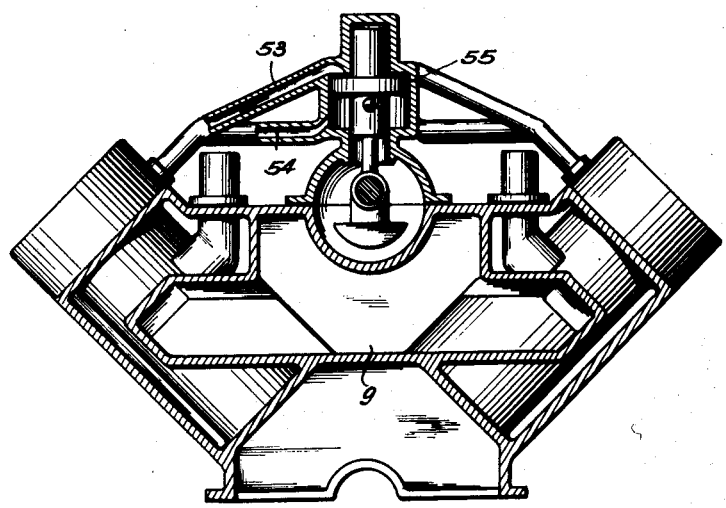
Fig. 7 is a transverse sectional view of the engine, the cutting plane passing between the engine cylinders and through one cylinder of a double acting blow-in pump with pump cylinders arranged in line.

Figs. 6 and 7 show two designs of double acting blow-in pumps. The pump shown in Fig. 6 is a 90° V-type pump which could for instance be used for a 4 cylinder V-engine. 51 is the left hand and 52 the right hand pump piston. Each of these pistons works in conjunction with two adjoining engine cylinders. 53 is the pressure line for the upper side and 54 for the lower side of the pump piston. The numeral 34 again designates the intake pipe of the pump and 35 the intake ports of the pump cylinders, said ports being controlled by the movement of the pump pistons and being common to both sides of said pistons. It is also possible to control the discharge of the pump cylinders by means of passages within the pump pistons as shown in Fig. 4.

Fig. 7 shows a double acting pump with pump cylinders in vertical position and arranged in line. 55 is a double acting piston working in conjunction with two engine cylinders of one of the banks of the V-engine. The numeral 53 again designates the pressure line leading from the upper portion of the pump cylinder and 54 the pressure line leading from the lower portion of the pump cylinder to the resp. engine cylinder. The pump piston is shown in top dead center compression position for the upper piston side. The crankcase design is similar to the design shown in Fig. 3.

What we claim is:

1. In a V-type two stroke cycle air scavenged engine: a centrifugal scavenging air blower, an ignition system, a piston type blow-in pump for furnishing high pressure air for blowing fuel into the engine cylinders, each acting side of a piston of said pump working in conjunction with an engine cylinder, said piston type pump being mounted within the space between the two cylinder banks, the drive of both said centrifugal blower and of said blow-in pump being taken off the engine crankshaft.

2. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft.

3. In a V-type two stroke cycle air scavenged engine: a centrifugal scavenging air blower, a scavenging air receiver located in the crankcase between the two engine cylinder banks, an ignition system, a single acting V-type piston pump for delivering high pressure air for blowing fuel into the engine cylinders, each cylinder of said V-type pump working in conjunction with an engine cylinder, said V-type pump having the same V-angle, the same crankthrow arrangement and the same direction of crankshaft rotation as said V-engine, said V-type pump being mounted on top of said scavenging air receiver, the drive of both said centrifugal blower and said V-type pump being taken off the engine crankshaft.

4. Engine according to claim 3 in which the V-angle of both the engine and the pump cylinder banks is 90°.

5. In a V-type two stroke cycle air scavenged engine: a centrifugal scavenging air blower, a scavenging air receiver located in the crankcase between the two engine cylinder banks, an ignition system, a double acting V-type piston pump for delivering high pressure air for blowing fuel into the engine cylinders, each cylinder of said double acting pump working in conjunction with two engine cylinders, said V-type double acting pump having the same V-angle as said V- engine and being mounted on top of said scavenging air receiver, the drive of both said centrifugal blower and said double acting V-type pump being taken off the crank shaft.

6. Engine according to claim 5 in which each cylinder of the double acting pump is working in conjunction with two engine cylinders of the same bank.

7. In a V-type two stroke cycle air scavenged engine: a centrifugal scavenging air blower, a scavenging air receiver in the engine crankcase, an ignition system, a double acting in line piston type pump with upright pump cylinders for furnishing high pressure air for blowing fuel into the engine cylinders, said piston type pump being mounted on top of the scavenging air receiver, the drive of both said centrifugal blower and of said piston type pump being taken off the engine crankshaft.

8. In a V-type two stroke cycle air scavenged engine: a centrifugal scavenging air blower, a scavenging air receiver in the engine crankcase, an ignition system, a piston type pump for furnishing high pressure air for blowing fuel into the engine cylinders, each acting side of a piston of said pump working in conjunction with an engine cylinder, said pump being mounted on top of said scavenging air receiver, the drive of said pump being taken off the impeller shaft of said centrifugal blower and the drive of said centrifugal blower being taken off the engine crankshaft.

9. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft; the intake pipe of said blow-in pump being connected to said scavenging air receiver, said blow-in pump being, thus, supercharged by the scavenging air blower.

10. In a V-type two stroke cycle air scavenged engine: a centrifugal scavenging air blower, a scavenging air receiver in the engine crankcase, an ignition system, a piston type pump for furnishing high pressure air for blowing fuel into the engine cylinders, each acting side of a piston of said pump working in conjunction with an engine cylinder, said pump being mounted on top of said scavenging air receiver, the drive of said pump being taken off the impeller shaft of said centrifugal blower and the drive of said centrifugal blower being taken off the engine crackshaft; a throttle valve in said intake pipe of said blower, said throttle valve serving as means of regulating the volume of both scavenging and blow-in air.

11. In a V-type two sthroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, inlet ports in the pump cylinder walls, the opening and closing of said inlet ports being controlled by the travel of the pump pistons, pressure lines leading from said pump cylinders to the engine cylinders, spring loaded valves in said pressure lines, said spring loaded valves being actuated by changes in pressure of the blow-in air.

12. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, inlet ports in the pump cylinder walls, the opening and closing of said inlet ports being controlled by the travel of the pump pistons, pressure lines leading from said pump cylinders to the engine cylinders, spring loaded valves in said pressure lines, said spring loaded valves being actuated by changes in pressure of the blow-in air, a fuel pump, fuel lines connecting said fuel pump to said pressure lines.

13. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, inlet ports in the pump cylinder walls, the opening and closing of said inlet ports being controlled by the travel of the pump pistons, pressure lines leading from said pump cylinders to the engine cylinders, spring loaded valves in said pressure lines, said spring loaded valves being actuated by changes in pressure of the blow-in air, a fuel pump, a fuel line leading from said fuel pump into the common intake pipe for all the cylinders of said blow-in pump.

14. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, a fuel pump, a drive shaft in said fuel pump, said fuel pump drive shaft being in line with and connected to the crankshaft of said blow-in pump.

15. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, a fuel pump, a distributor, said fuel pump and said distributor being directly driven by the crankshaft of said blow-in pump and being arranged in line with said blow-in pump.

16. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, said blow-in pump being designed as a separate unit and serving as cover for the scavenging air receiver.

17. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft; the lower part of the crankcase of said blow-in pump being a part of the upper wall of said receiver and being cast integrally with the engine crankcase and being designed in such a way that the crankshaft of said blow-in pump can be installed from the top.

18. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, a crankshaft in said blow-in pump, balance weights fastened to said pump crankshaft.

19. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, cylinders of said blow-in pump arranged in two banks in V shape, pressure lines connecting the blow-in pump cylinders to the engine cylinders, said pressure lines leading from the side of the pump cylinders facing the engine cylinders to the side of the engine cylinders facing the V angle.

20. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, said blow-in pump being mounted in the center plane of the V angle formed by the two engine cylinder banks.

21. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, ports in the cylinder walls of the blow-in pump, pressure lines leading from said ports to the engine cylinders, passages through the pump pistons leading from the top of the piston to the piston skirt, said passages being arranged in such a way as to line up with said ports at the time fuel is blown into the engine cylinders.

22. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scaveging air receiver, the drive of both said centrifugal blower and said blow-in pump being taken off the engine crankshaft, ports in the cylinder walls of the blow-in pump, pressure lines leading from said ports to the engine cylinders, passages through the pump pistons leading from the top of the piston to the piston skirt, said passages being arranged in such a way as to line up with said ports at the time fuel is blown into the engine cylinders, springless blow-in valves at the engine cylinder ends of said pressure lines.

23. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, ports in the cylinder walls of the blow-in pump, pressure lines leading from said ports to the engine cylinders, passages through the pump pistons leading from the top of the piston to the piston skirt, said passages being arranged in such a way as to line up with said ports at the time fuel is blown into the engine cylinders, springless blow-in valves at the engine cylinder ends of said pressure lines, said ends of said pressure lines pointing towards the center of the cylinder space occupied by the air charge.

24. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mouted on top of said scavenging air receiver, the drive of both said centrifugal blower and said blow-in pump being taken off the engine crankshaft, a carburetor fastened to the intake pipe common to all cylinders of said blow-in pump.

25. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, an intake pipe for the blow-in pump, a throttle valve in said intake pipe, said throttle valve being actuated by the gas pedal, a governor operated by the vacuum pressure at said throttle valve, said governor acuating the throttle valve of said blower as well as the fuel pump control rod.

26. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, the displacement volume of the cylinders of said blow-in pump being larger than 20% of the displacement volume of the engine cylinders.

27. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, said blow-in pump delivering methane to the engine cylinders.

28. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, said blow-in pump delivering gaseous fuel and additional air to the engine cylinders, the displacement volume of the blow-in pump cylinders being larger than 25% of the displacement volume of the engine cylinders.

29. In a V-type two stroke cycle air scavenged engine: a centrifugal type scavenging air blower, an ignition system, a scavenging air receiver located in the crankcase between the two engine cylinder banks, a piston type blow-in pump for delivering high pressure air for blowing fuel into the engine cylinders, each acting side of a piston of said pump working in conjunction with an engine cylinder, said blow-in pump being mounted on top of said scavenging air receiver, the drive of both said centrifugal blower and said blow-in pump being taken off the engine crankshaft, said blow-in pump being used to finely atomize liquid fuels of low volatility.

OTTO ELWERT.
ADOLF SCHNÜRLE.

References Cited in the file of this patent

UNITED STATES PATENTS

| Number | Name | Date |
|---|---|---|
| 415,446 | Charter | Nov. 19, 1889 |
| 765,159 | Aslakson | July 19, 1904 |
| 824,743 | Richter | July 3, 1906 |
| 1,200,853 | Kimball | Oct. 10, 1916 |
| 1,296,686 | Neff | Mar. 11, 1919 |
| 1,350,260 | Long | Aug. 17, 1920 |
| 1,703,096 | Burtnett | Feb. 26, 1929 |
| 1,853,712 | Woolson | Apr. 12, 1932 |
| 2,057,062 | Schneider | Oct. 13, 1936 |

FOREIGN PATENTS

| Number | Country | Date |
|---|---|---|
| 159,840 | Germany | of 1905 |
| 170,053 | Germany | of 1906 |
| 247,745 | Germany | of 1912 |
| 511,343 | Germany | of 1930 |
| 439,909 | France | of 1912 |